Jan. 4, 1944.  M. E. PARKER ET AL  2,338,689
PROCESS OF TREATING AND CONDITIONING CONTAINERS
Filed Aug. 7, 1941
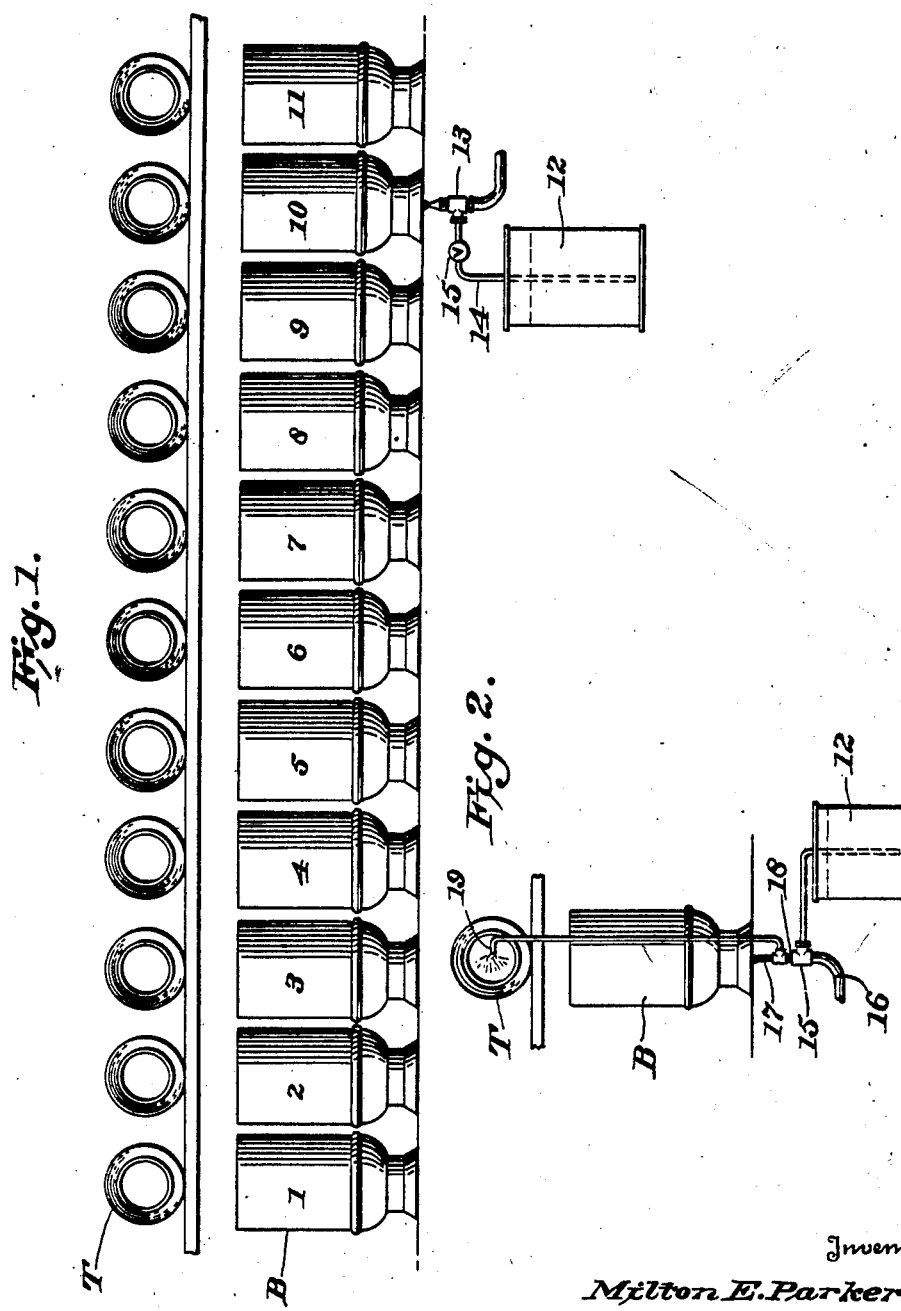

Patented Jan. 4, 1944

2,338,689

UNITED STATES PATENT OFFICE 2,338,689

PROCESS OF TREATING AND CONDITIONING CONTAINERS

Milton E. Parker, Barrington, Ill., and Paul W. Bonewitz, Burlington, Iowa, assignors to The Rex Company, Burlington, Iowa, a corporation of Iowa Application August 7, 1941, Serial No. 405,864

21 Claims. (Cl. 21—57)

This invention relates to improving the aseptic characteristics of containers and involves conditioning the same to eliminate objectionable bacterial and bio-chemical contamination. We have determined that these factors contribute materially to loss of quality frequently evidenced in foods generally and more specifically in milk, cream and milk products. In particular, the invention is applicable to such re-use receptacles as the large metal cans now in constant employment for transporting milk and milk products from the producing farm to the receiving station or processing plant.

Marked improvements have been made in the sanitation of such containers spurred by reports from dairy control laboratories of unsatisfactory quality in milk and milk products. Such progress, however, has been of a mechanical nature (i. e., represented by advances in can design, better metallurgy and metal coating and more efficient hydraulic cleaning and washing practice) and detergents of increased effectiveness.

As distinguished from these prior efforts to improve can sanitation the present invention embodies a recognition (a) that the failures of sanitation in the receptacle are traceable to bacterial and chemical contamination in the can itself and in the customary washing solutions and (b) includes the discovery that the remedy for these conditions lies in the field of microbiology and biochemistry.

Our investigation of the problem has revealed that the objectionable conditions observed by the milk control laboratories are not overcome notwithstanding employment of the best available container constructions, the most advanced washing and cleaning methods and detergents, and the production of a visibly clean, dry and hot can as demanded by sanitarians in the milk industry. For example, if the food contact surface or wall of such a dry, visibly clean container is moistened with water and allowed to remain overnight, offensive odors develop. Also, when milk or milk products are filled into such a dry, visibly clean can, they often develop undesirable, bitter and stale flavors.

We have traced these results through chemical analysis and microanalysis to the presence on the wall of the container of a colloidal film having an alkaline reaction and carrying objectionable bacteria principally of the proteolytic, lipolytic, thermoduric and thermophilic types and nutrients therefor such as protein and protein complexes formed by reaction with alkaline detergent solutions. This film persistently clings to the wall and is not removed by the most severe cleaning and washing methods. In the alkaline environment the bacteria propagates freely when the can is wetted with water or with milk and milk products as evidenced either by a microanalysis of a water sample washed from the can wall or of a sample of the milk or milk product held in the container.

We have determined that the colloidal film is deposited from the washing solution employed in the automatic can cleaning equipment and that the solution acquires greater film forming properties as the number of cans cleaned increases through the day's run. This is true, notwithstanding that the pH of the solution is decidedly alkaline, e. g., pH 10 and the temperature of the solution is between 140° F. and 170° F. In other words, the objectionable bacteria collecting in the alkaline washing solution propagates rapidly and is provided continuously with increased nutrients such as protein and fat in accordance with the length of time that the solution is used in the automatic washing installation. Such flora and particularly the solids including protein in the alkaline wash water so enhance the film forming properties of the washing solution that the presence of the film becomes more and more pronounced on successive cans as the washing continues and the concentration of bacteria and nutrient food substances therefor becomes greater.

It is the principal aim of the present invention to eliminate the aforementioned colloidal alkaline reacting film with its bacteria and nutrient, and provide a can which is not only visibly clean but of marked importance, is microbiologically sanitary as well.

Another equally important object of the invention is to impart to the inner wall surface of the container an acid reaction which will remain effective to inhibit the growth of objectionable bacteria long enough to reliably embrace the time period between cleaning and filling of such containers and the processing of their contents. In this connection the acidity imparted to the interior can wall surface need be only slight, e. g., pH 6 to pH 6.5. In some cases, a neutral reaction imparted to the wall surface is satisfactory, but an acid-reacting surface is preferred. In other words, the reaction of the inner can wall should test substantially non-alkaline and in no case should the reaction of the can wall be on the alkaline side or otherwise favorable to the propagation of bacteria which will detract from the quality of the contents.

A further object of the invention is to remove the film and change the alkaline reaction of the inner wall of the container to acid or neutral in a single step. For example, a most effective and convenient means for carrying out the present invention is to inject the acid into the can with the steam customarily used in the steam rinse associated with the most accepted washing practice. Thereafter, the can is dried in the usual manner with dry, warm air so that preservation of the acid-reacting surface is assured.

An additional object of the invention is to provide for removing the film and imparting an acid or neutral reaction to the can wall in a manner which will allow the invention to be associated with, i. e., incorporated as a part of the usual and accepted automatic can washing equipment without impairing the speed or efficiency of the same and at a cost which is negligible. The invention, of course, may be practiced independently. In any case, the acidification should be carried out so as to assure that an acid or neutral reaction is maintained on the inner wall surface of the container.

Another object of the invention is to provide an acid material which will be effective to release the film from the container wall and which, in the case of metal cans, will exert no appreciable corrosive effect and, in fact, may act as a protective agent in certain cases.

The problems created by a bacterial and chemical contamination of the inner surface of the can are, as will be appreciated from the foregoing explanation, manifold, and are each overcome by the present invention. First, it is necessary to remove as a quality reducing factor, the colloidal alkaline reacting film and produce a microbiologically clean can. It is equally important that conditions be maintained whereby any residual traces of the film remaining on the can wall will be rendered innocuous, e. g., a neutral or preferably an acid reaction or other condition must be imparted to the wall surface which is unfavorable to the growth of objectionable bacteria or to the creation of new conditions detrimental to food quality. At the same time, the treatment to accomplish this result in order to be most practical, must not interfere with the sanitary efficiency of or impair the speed of the automatic washing machinery, or increase costs. Moreover, corrosion must be avoided.

In practicing the invention, the acid or acid material employed breaks up and releases the colloidal film in a manner similar to the collapse of a soap bubble when brought in contact with an acid solution. The released film is physically removed, i. e., drained off, but a sufficient amount of acid is retained on the wall of the container after drying to impart a condition unfavorable to objectionable bacterial growth. As a result, cans delivered from the automatic washing machine at all times are not only visibly clean, dry and hot, i. e., macroscopically clean, but also of particular significance are microscopically clean. In other words, whereas sanitarians have insisted that the container be visibly clean and by that is meant the negative absence of visible dirt, milk solids or other extraneous matter rather than positive evidence of a surface free of contaminating influences, the surfaces of the cans delivered from the washer in accordance with this invention are freed of microbiological and biochemical factors detrimental to quality. As explained, such factors have apparently been heretofore ignored, and we have determined by exhaustive examination that they are to a large extent the cause of the objectionable conditions observed by the dairy technicians and which are now overcome.

Not only does the acid release the colloidal film of cleaning solution with its bacterial contamination and nutrients adhering to the metal surface of the can, but the presence of the acid in the injected steam enhances the sterilizing action of the steam itself. The can is left in acid condition with no appreciable concentration of nutrient materials or objectionable bacteria. This has been completely demonstrated by (a) no development of offensive odors in a moistened can; and (b) a preponderance of acid types of bacteria in any exhaustive microbial examination of clean cans given a final acid treatment.

With respect to the acid or acid material employed, this is dependent upon a number of conditions. The acid employed must be one which will exert an inhibitive action upon the type of bacteria which normally persists and gets through the cleaning process in a can washer and which is particularly true of any dairy cleaning practice which uses alkaline products. Moreover, the acid or acid material must be one which exerts the least corrosive effect upon the container. It is equally important that the acid or acid material, since it is allowed to remain on the container wall, be of a character which will not deleteriously affect the contents, or the container itself.

The acid or acid material is used in very dilute solution, e. g., 1% or less and is only employed in amount to impart to the container wall a pH on the acid side preferably between substantially pH 6 and pH 6.5 and an average pH of about pH 6.4.

We have discovered that gluconic, levulinic or hydroxyacetic acids, sodium acid pyrophosphate or mono ammonium phosphate and mixtures thereof, are particularly useful in meeting each of the aforesaid conditions and exert substantially no corrosive action. For instance, our tests show gluconic acid, for example, to be only one-tenth as corrosive as citric acid on tin and only one-ninth as corrosive as citric acid on iron.

Other organic and mineral acids may be employed. These will, of course, be used in accordance with the container and its contents and in amount to remove the film and afford the desired inhibitive acid reacting surface without causing undue corrosion or affecting deleteriously the quality of the contents. Gluconic, levulinic, and hydroxyacetic acids are preferred, but the following organic and mineral acids may be used and are listed in their order of preference as regards non-corrosiveness:

| | |
|---|---|
| Fumaric | Citric |
| Tricarballylic | Tartaric |
| Aconitic | Phosphoric |

Also, chlorine compounds may be utilized in association with one of the above-mentioned organic acids, for example, gluconic acid, and it appears that in such a composition, the sterilizing action of the chlorine compounds is not stabilized as is usually true where an alkaline reaction is employed. When, for example, gluconic acid is used in conjunction with chlorine compounds in the manner described herein for conditioning cans, the sterilizing effect is enhanced. Moreover, when used in connection with gluconic acid, the corrosive action of adjusted chlorine compound will be minimized, as has been determined by exhaustive tests.

The use of chlorine compounds is attended with considerable difficulty, since where the solutions have a pH on the acid side, they are objectionably corrosive to dairy metal. The effectiveness of such solutions, moreover, decreases in accordance with any increased alkalinity, and in order to preclude or adjust corrosiveness, it is necessary to use the solutions with an appreciable alkaline pH. In a case of the present invention, where the chlorine compounds are combined as stated above with one of the organic acids, preferably a sugar acid, the acid has a buffering effect, and although the pH of the solution be on the acid side, no objectionable corrosion takes place.

As explained above, the character and amount of the acid which is employed are important, since we do not rinse the acid from the can and thereby leave the same in an acid condition and maintain this condition for a period of time such as experience has indicated elapses between the time the can is cleaned, and the time it is filled. This, of course, may be very brief in some cases while in other cases is quite extended. In any event, our examination discloses that in cans treated in accordance with this invention, there is no development of offensive odors due to inadvertent moistening and further there is a preponderance of acid types of bacteria in the cans maintained in such acid condition so that the original quality of the milk products is not affected but even enhanced.

The invention is useful in connection with single trip containers as well as re-use containers and is effective upon receptacles of metal, glass and other materials. The invention has been and will be further described in connection with re-use milk transport cans not only for purposes of illustration, but also because the marked advance in can sanitation whereby the usual alkaline condition in the can is changed to acid, is of particular significance in the dairy industry.

In using the acids and acid phosphates referred to herein, we find that excellent results are obtained if a wetting agent is incorporated in the solution. The wetting agent increases the penetrating properties of the solution by materially lowering the surface tension of the water. In some cases the wetting agent has a bactericidal value which adds to the effectiveness of the acid solution.

In the accompanying drawing, we have illustrated diagrammatically and will describe one modern washing practice for cleaning large milk cans of the re-use type and formed of tin coated iron or steel. This method is generally typical of the best procedure, wherein the receptacles and their tops are subjected to washing with alkali detergent solutions, sterile rinses, and steam treatment generally in the sequence recited.

In the drawing,

Figure 1 is a diagrammatic illustration of one method of washing and acidifying containers in accordance with this invention; and Figure 2 is a diagrammatic illustration of a modification showing how both the container and cover are acidified.

Referring to the drawing, the character T indicates the tops of the receptacles and the character B indicates the bodies thereof, it being noted that the containers are positioned upside down. In the automatic can washing equipment, the cans and their covers automatically move step by step through the various instrumentalities and a visibly clean, dry and hot can with its top applied thereto is delivered from the apparatus.

The first step in the washing procedure consists in permitting the can and cover to drain as shown at 1. Next, the can and cover are given a preliminary steam rinse as shown at 2 by injecting steam therein to facilitate the removal of any adhering fat and cream particles which are drained and collected in the drip saver. The can and cover are then given a cold water rinse as at 3 whereupon at 4 they are permitted to further drain so as to prevent undue contamination of the detergent solution which is next employed.

The cans and covers are given both an inside and an outside scrubbing action at 5 and 6 by hydraulic force with the detergent solution which usually consists of an aqueous solution of alkali compound. Such compound generally includes various and varying proportions of soluble alkalies such as the sodium salts of phosphate, carbonate, metasilicate, and in some cases caustic. In this connection, the solution may be carefully controlled by means of an instrument which makes possible the determination of alkalinity by measurement of the conductivity of the solution. The alkali wash water is usually maintained at a pH of 10.0 and a temperature of about 125° to 140° F. Possibly, because of these conditions, it has never been appreciated that objectionable bacteria notably proteolytic, lipolytic, thermoduric and/or thermophilic bacteria thrive in this alkaline solution and are constantly supplied with food such as milk protein and fat which is washed out of the cans and covers.

The use of the alkali solution is, of course, in recognition of the fundamentals of cleaning methods, namely, it is understood that in order to clean a surface it is necessary to be able to wet it with a film of the cleaning solution itself. But it was never appreciated that the alkali film was a carrier for objectionable types of bacteria and their food, and that these enhanced the film-forming properties of the alkali washing solution. In fact, the existence of an alkali reacting film of this composition which persistently adhered to the finally cleaned, dry container wall, and its contribution to bacterial and chemical contamination in the can with resultant impairment of the quality of the milk and milk products, have been ignored or the problem if understood has defied solution. At any rate, most milk sanitarians are so willing to accept the standard plate count as a proper yardstick of the sanitary quality of milk and its containers that no one apparently has been particularly interested in the microbiology and biochemistry of can washing. Yet, it is a fact, as our tests have shown, that the film forming alkali wash water is a contributing force in deleteriously affecting the quality of dairy products.

This condition is improved if fresh, i. e., unused alkali cleaner is supplied to each can at stations 5 and 6 from a jet in the form of a fog or mist and furthermore the effectiveness of the mist or fog is enhanced by the inclusion in the alkali solution of a wetting agent such as will be later described herein. In this connection, an acid cleaning solution such as will be later referred to may be used at station 6 instead of the customary alkali cleaning solution or fresh, i. e., unused, acid cleaning solution may be applied to each can and as a fog or mist at this station.

At 7 the can and cover are drained of most of the alkali solution and at 8 are given a final pump rinse with hot water. In position 9 the can and cover are given a further rinse with sterile water, and the hot water from both rinsing steps 8 and 9 is directed so as to overflow into the tank of the cleaning solution whose alkalinity must be maintained at the proper concentration for effective results. An examination of this rinse water disclosed a definite count of proteolytics, alkali formers, and acid formers in the same notwithstanding that the rinse water delivered to the alkali washing solution had a temperature of 170° F.

We examined the cleaning solution and found that after 400 cans had been through the washer, it gave a tremendous count of bacteria which appeared to be for the most part proteolytics or alkali formers. This was true in spite of the pH 10 alkalinity and 140° F. temperature of the cleaning solution. Also, we found a definite count of proteolytics and alkali formers in the hot (170° F.) rinse water. Since the water used to wash the cans in operations 5 and 6 consisted of the alkali solution and the rinse water, we examined the cleaning solution at different intervals during the day to see what chemical changes had taken place, and the results are given in the following table:

*Chemical analyses of cleaning solution in can washer at different intervals*

| Sample | Alkalinity (as NaOH) | Milkfat | Protein | Total solids | Ash |
|---|---|---|---|---|---|
|  | Per cent | Per cent | Per cent | Per cent | Per cent |
| Fresh solution | 0.25 | .00 | Trace | 0.49 | 0.11 |
| After 320 cans [1] | 0.22 | .18 | .03 | 0.54 | 0.20 |
| After 607 cans [1] | 0.09 | .34 | .18 | 0.74 | 0.16 |

[1] Cans were used for transporting sour cream.

From the above data, it is evident that the accumulation of fat and protein increased with the number of cream cans washed, thereby providing nutrients for the surviving bacteria. The variations in alkalinity and ash can be explained on the basis of solution dissipation and dilution. However, the marked increase in total solids, protein and fat in a sample taken after cleaning 607 cans, with the drops in alkalinity and ash, indicates that milk fat or protein complexes formed by reaction with the alkali present contribute to colloidal film formations in the cleaned cans.

The can and cover are then passed to position 10 where it receives the steam rinse. This rinse consists in injecting into the can and inside surface of the cover, steam at a sufficiently high temperature to practically sterilize the container. Following the steam treatment, the can and cover are subjected at 11 to a drying action by forcing heated air into the can in order to remove last traces of moisture on the inner contact surface of the can and cover. Thereafter, the can is inverted to an upright position, the cleaned cover is automatically placed on the same, the bottom of the can is rinsed to dislodge any dirt which might be adhering thereto and the can is delivered automatically from the machine. Containers so washed by a most accepted and severe method, although delivered visibly clean and in a hot, dry condition, when examined by the quality control laboratory revealed a definite inoculation of the objectionable types of bacteria, and, in fact, a good husky flora of such microorganisms were found in cans which were cleaned last in a day's operation. This film retained the undesirable types of bacteria and nutrient material with the bacterial contamination sufficient to create difficulties should the can be moistened. Also, it was found that even the dry cans serve to inoculate the milk with undesirable bacteria which imparted bitter and often stale flavors to the fresh cream or milk subsequently added to such cleaned cans.

In carrying out the present invention and by way of illustration, a tank or bottle 12 containing the acid preferably gluconic acid in dilute aqueous solution of about 1% or less concentration is positioned in proximity to the final steam rinse nozzle 13. A suitable pipe or tube 14 leads from the nozzle into the tank 12 and the nozzle is provided with an injector device to suck the acid from the tank and deliver a mixture of steam and acid to the container and cover. A suitable valve 15 controls the amount of acid solution drawn into the injector.

The function of the acidified steam is to facilitate releasing from the food contact surface, i. e., from the inside wall of the container, the adhering colloidal alkaline reacting film of undesirable bacteria and nutrient substances. This action is somewhat similar to the collapsing of a soap bubble in contact with an acid solution or the failure of soap suds to form in an acid condition or when an acid reaction develops in a cleaning solution.

It will be noted that at position 10, namely, where the container and cover are given the final steam rinse, that the colloidal film released from the container wall is permitted to drain, but no subsequent rinsing with liquid is utilized since it is desired to maintain the interior wall of the container in acid reacting condition. After the container has been dried in a conventional manner at 11, a test of the interior wall discloses that it has an acid reaction usually in the neighborhood of about pH 6.4.

In Figure 2, we have illustrated the manner in which both the container and the cover therefor are treated preferably simultaneously in accordance with this invention. At position 10, the acid solution is withdrawn from the vessel 12 by a suction injection valve 15 in the steam line 16 and the acidified steam is injected into the container from the spray 17 connected in the line 18 and into the top or cover T from the spray 19 also connected into the line 18.

It will be noted that the present invention is readily incorporated in conventional washing equipment without impairing the efficiency or speed of the same and the cost which the injection of the acid involves is negligible.

While we have illustrated and described the injection of acidified steam, similar results are obtained by making a very dilute acid solution in a hot water rinse tank and after treating the containers with such a rinse, they are dried in the manner described to leave the food contact surface or wall of the container in an acid condition. This procedure is particularly desirable in the case of can washers which have no steam jet and instead of steam have a final rinse with water at about 210° F. Moreover, acidification can also be accomplished by injecting the acid under pressure using an air blast preferably of hot air. In any case, the finally dried can is substantially devoid of the colloidal alkaline reacting film containing bacteria and nutrient therefor which has been replaced by an acid film capable of giving the food contact surface an acid or neutral reaction.

Our examination of the cans treated in accordance with this invention indicates that, for example, acidulating the steam by the suction injection of an acid solution sufficient to change the reaction of the cleaned cream cans from alkaline to acid resulted not only in a significant change in the types and numbers of the bacteria present in such cans, but also in complete absence of offensive odors in the treated cans held overnight after adding 100 cc. of sterile water to these same cans in order to moisten the inner contact surfaces. Likewise, when milk was added to such cans, it suffered no reduction in quality as heretofore.

The value of gluconic, levulinic, and hydroxyacetic acids and the acid phosphates, as stated above, are a discovery of special significance because containers are frequently of iron, or iron provided with a tin coating. Our examination discloses that these acids and acid phosphates do not produce any appreciable corrosion in either case and, therefore, it is particularly acceptable with tin-coated containers which, because of wear or for other reasons, have exposed iron spots. As pointed out above also, the action of the acids and acid phosphates is of a protective nature under these circumstances.

Regarding concentration of the acid solution, 1% or less of acid or acid phosphates in aqueous solution makes a very satisfactory stock solution. Thus, one pint of gluconic acid added to ten gallons of water provides a stock solution which will treat from six hundred to one thousand cans depending upon the intermittency of operation. Examination of cans treated with this stock solution discloses that they have the desired pH in the neighborhood of pH 6.4.

The present invention is distinguished from those processes wherein containers are washed successively with alkali and acid solutions but then are finally washed with water. Furthermore, conventional hot water rinses, steam rinses and hot air blasts without the acidification treatment described herein act to set the colloidal film and apparently increase the tenacity of its adherence to the food contact surface as well as contribute to the building-up of a substantial milk-stone deposit.

Containers cleaned in accordance with this invention in addition to complying with the requirements of being visibly clean, hot and dry have the equally essential and novel beneficial characteristic of being microbiologically clean. Thus, a clean milk can and cover are now one in which substantially all of the alkali cleaning solution is eliminated because unless such condition is provided and the interior contact surfaces are rendered non-alkaline, i. e., acid or neutral reacting by the presence of a film of the acid, viable microorganisms capable of surviving high temperatures and definite alkalinity are apt to be lying in wait to impair the quality of the milk or milk products of other foods subsequently filled into such a container.

In addition to the foregoing, we have extended the practice of treating the alkali reacting cans with steam acidified with acid such as gluconic acid to control milk-stone deposits and eliminate thermoduric and/or thermophilic microorganisms. In this connection when the solutions described herein are prepared from even the hardest waters the beneficial effects are found to be obtained, even though the solution is of a character which does not have a definite acid reaction. This is due to the fact that the alkalinity of the water is reduced to a point where the effectiveness of the acid is not impaired.

We have used the term "non-alkaline" in the following claims to describe that condition which will render innocuous the presence of any objectionable bacteria. That is, notwithstanding the container be wetted or filled, any traces of bacteria such as proteolytic bacteria will be rendered ineffective to impair the quality of the contents such as milk by the presence on the can wall of an acid film. The term "acid" is intended to include both organic and mineral acids, as well as acid materials capable of carrying out the function of the acid described herein, e. g., chlorine compounds in which an acid is included.

The term "objectionable bacteria" is intended to include any bacteria which survives and propagates in an alkaline environment and which detracts from the quality of the contents. Proteolytic and lipolitic bacteria are the most important microorganisms in this respect, but there are, of course, others which are eliminated and rendered innocuous by the treatment described due to the unfavorable reaction thereby provided such as thermoduric and thermophilic bacteria.

While we have described the invention in connection with large milk transport cans or packages of the re-use type, it is equally satisfactory in connection with single trip containers, for example, tin cans used for canning food products generally such as condensed milk, vegetables, fruit, etc. The invention is particularly useful for the canning of products having in common with milk the characteristic that the presence of an acid film resists the tendency to putrefaction, e. g., such as beer, tomatoes, citrus fruits, and other comestibles, the quality of which is impaired by an alkaline food contact surface tending to reduce their acid characteristic. That is, the process of cleaning, acidifying, filling and sealing as practiced at a dairy producing farm is likewise useful in food packaging, for example, at a cannery. In the case of the single trip container which has not been heretofore used, the extensive washing treatment may or may not be resorted to, but the acidification or acidification accompanied by steam sterilization, as described, followed by filling and sealing of the cans will be found highly desirable. The presence of a non-alkaline, i. e., neutral or acid reacting film on the interior of the can wall including the top and bottom will serve to prevent the growth of objectionable bacteria which has been a vexatious problem with canneries and will reliably assure that the original quality of the canned food product will be preserved.

Another method as heretofore mentioned of eliminating the alkaline film and imparting to the food contact surface an acid or neutral reaction is to employ an acid reacting washing solution for the containers in lieu of the conventional alkaline washing solution. This will result in the presence on the food contact surfaces of an acid film having the function of the acid film hereinbefore described. Such an aqueous washing solution will sometimes contain an enzyme capable of peptizing protein, an acid to render the solution on the acid side, a fat emulsifying agent and a wetting agent which will effect the desired penetration. For example, a satisfactory solution contains in addition to the water an enzyme such as pepsin as the peptizing ingredient, gluconic acid for imparting the definite acid reaction, lecithin as the emulsifier for fat substances, and a wetting agent of the order of sulphonated alcohol or sulphonated petroleum fractions. In one such aqueous washing solution, there will be one part lecithin, nine parts pepsin, about 2% of wetting agent and sufficient acid to carry the pH on the acid side, e. g., 6.4. These proportions may be varied as conditions require. The solution can be prepared in concentrated form for subsequent dilution with water. In the concentrated solution, the pH is preferably about pH 2. Containers treated with this washing solution will, as stated, have the desired acid film and possess all of the advantages of containers given the acidification treatment hereinabove stated.

As stated above, other acids than gluconic which has been described for purposes of illustration and effect to insure the optimum cleaning results described without being objectionably corrosive may be utilized, such as phosphoric acid in properly dilute solution, as well as hydroxyacetic acid, as prepared by Dupont Company, and sodium acid pyrophosphate or monoammonium phosphate, as made by Monsanto Chemical Company and levulinic acid.

While it is not always necessary, we prefer to employ a wetting agent in the acid cleaner composition such as alkyl aryl sulphonate, preferably "Santomerse #3" of Monsanto Chemical Company, or sulphonated petroleum fractions which are effective bactericidal agents. Other wetting agents may be employed, such as 3,9-diethyl tridecanol, 7-ethyl-2 methylundecanol and 2-ethyl hexanol, but these are not preferred. In addition, "Duponol" and "Alkanol WXN" of Dupont Company, as well as "Nacconol" of National Aniline and Chemical Company, and the "Areskap" products of Monsanto Chemical Company may be used.

Another suitable acid cleaning composition comprises a solution of gluconic or levulinic acids or mixtures of the same in about 50%, a wetting agent, in about 10%, a suitable enzyme such as pepsin, trypsin, or papain, in about 1%, and the remainder water. The wetting agent, as stated above, is preferred but is not always required, while the use of the enzyme is optional. The composition is added to water to form an acid cleaning solution having a concentration of about 2%. By reason of the method employed, this solution gives the highly satisfactory results above mentioned.

A further suitable cleaning composition comprises a mixture of levulinic acid and gluconic acid in about 35%, a wetting agent in about 10%, a water soluble oil in about 25% and the remainder water. An enzyme as with the previous composition may or may not be employed.

In the several formulae described above, the levulinic acid is present in amount of about 2 to 5%. It imparts a desirable odor and exercises an inhibiting effect on the growth of microorganisms, particularly molds. The levulinic acid is non-corrosive to dairy metal and also exerts detergent properties. The gluconic acid is likewise non-corrosive to dairy metal and exercises a buffering action.

The wetting agent contains no fillers which would react with the acids, thereby removing any likelihood of the formation of corrosive acids. For example, should the wetting agent contain an excess of sulphates, there may result the formation of sulphuric acid, the corrosiveness of which would be highly objectionable.

The water soluble oil gives a superior result in many cases and is of a type which makes for a true solution with no oiling off, even at high temperatures. Preferably the oil has detergent properties and protects the solution against formation of corrosive substances which might otherwise be formed when the solution is further diluted with water containing sulphates, etc. as when the stock solution is diluted for use in the plant.

With respect to the water soluble oil, there are many varieties available, but the important characteristic which such oil must possess for our purposes is that it remain in true solution in an acid reacting composition. That is, the oil must not be affected by pH or temperature changes in the solution, as distinguished from oils frequently used in making emulsions. We have found that "#25 acid compound" prepared by Standard Oil of Indiana is a most desirable soluble oil for our purposes, and we also have found satisfactory as the soluble oil, a mixture of "Petromix #1-B" and "Klearol White Mineral Oil" as prepared by L. Sonneborn Sons, Inc., Chicago, Illinois.

As pointed out above, the acid constituent may be entirely levulinic or entirely gluconic, or any proportions of mixtures of the same. The two examples are illustrations of preferred compositions which have been found highly useful.

Phosphoric acid is used in the proportions specified in the above examples, and it is important to utilize an amount of the soluble oil or other corrosion inhibiting agent effective to preclude corrosion. When the phosphoric acid is used in the proportions stated in the foregoing examples, at least 25% of the soluble oil should be employed for this purpose.

Where hydroxyacetic acid or sodium acid pyrophosphate or monoammonium phosphate are used, they will be employed in the proportions such as specified in the foregoing examples. In this connection, dry compositions may be produced containing these materials and a wetting agent; water may be added to the powder by the user. Further, with such substances, it is not necessary to use a water soluble oil.

It is preferred to use the organic acids, since should the same be present in excess, there is little or no likelihood of corrosion, whereas when inorganic acids of the order of phosphoric are employed, a careful control must be exercised to prevent corrosion effects.

It is to be understood that all of the acids referred to above, or any two or three of them, may be used as a mixture to provide the acid constituent of our improved cleaner.

It is preferred to use, in all of the cleaning compositions or solutions, a wetting agent and a water soluble oil. The compositions or solutions may, however, be prepared without the use of the enzyme or the oil, but we prefer to use the oil with the gluconic and levulinic acids and particularly with phosphoric acid, since in the latter case it acts to control corrosiveness, should the phosphoric acid be present in excess.

While we have referred herein to the delivery of a dry can from the washing apparatus, and to a preferred procedure in which the drying is accomplished by means of hot air, it is an important characteristic of containers and covers treated in accordance with this invention that any wet containers or covers will not develop offensive odors or deleteriously affect dairy and other products which may be subsequently carried in such containers. This is due to the acid film present upon the food contact surface. Thus, while it is preferred to have a dry can, the acid treatment takes care of conditions where, for any reason, this is not possible. Further in some cases, the temperature of the steam rinse is sufficiently high to preclude the necessity for a subsequent drying operation.

We have also found it satisfactory to dispense with the final steam rinse. For instance, the temperature of the hot water rinse (200–210° F.) at stations 8 and 9 or either of them will impart a high temperature to the can, so that the acid cleaner may be injected by means of an air blast, preferably a hot air blast and a can is delivered from the apparatus in a dry, hot, substantially sterilized condition. In other words, the final steam rinse can be dispensed with if hot water of sufficient temperature is used for rinsing and immediately thereafter a final charge of the acid cleaner is introduced by means of air injection, preferably hot air. The economy of this process will be readily understood, since it eliminates the expense of a steam rinse, i. e., when the final steam rinse is dispensed with, the hot air blast carrying the final acid cleaner charge follows the hot water rinse.

As stated, it is preferred that the food contact surface of the container, i. e., the inner wall, will have an acid reaction, although in some cases a neutral reaction will give satisfactory results. In this connection, the pH is preferably between about pH 6 and pH 6.5 but in some cases may be between pH 2 and pH 6.5. In the case where gluconic acid is the acidifying medium, the pH may be substantially lower without danger of deleteriously affecting the container or contents. In any event, the pH should be of an order as to eliminate the objectionable effects herein described and overcome by this invention.

The invention embodies a processing treatment in which the cans, when ready for cleaning, are subjected to the usual alkali cleaner or the novel acid cleaner described therein in the customary manner followed by rinsing with water, and the acid treatment for the purpose of providing the food contact surface of the can with an acid reaction. The processing is enhanced if the alkali or acid cleaning solutions have incorporated therein a suitable wetting agent as described. Further, the processing is improved by using fresh, i. e. unused or virgin alkali solution or acid solution, preferably with a wetting agent, and introducing the fresh solution into each can in the form of a fog or mist, as distinguished from a hydraulic spray.

While we have referred herein to the treatment of metal containers, we have also found that glass containers may be washed and rinsed by the various methods described. That is, we have discovered that by processing glass receptacles the excellent results described above are obtained, and that an acid condition on the glass surfaces in contact with milk, for example, gives similar beneficial advantages. In the case of glass containers, steam rinses may likewise be omitted.

This application is a continuation-in-part of our application Serial No. 359,785, filed October 4, 1940.

We claim:

1. The process of cleaning containers to render the food contact surfaces thereof inhibitive to the growth of objectionable bacteria which comprises washing the same with a solution having an acid reaction and forming upon the food contact surface of the container an acid reacting film which is retained thereon and is substantially non-toxic and non-corrosive to metals and has a pH below that in which said bacteria may propagate.

2. The process in accordance with claim 1 in which the container is filled while the food contact surface has an acid reaction and sealed.

3. The process in accordance with claim 1 in which the solution contains gluconic acid.

4. The process in accordance with claim 1 in which the washing solution is sprayed into the container.

5. The process in accordance with claim 1 in which the washed container is dried and the acid reaction retained on the food contact surface thereof.

6. The process of cleaning containers which have been washed with an alkali solution comprising treating the same in accordance with claim 1 and releasing and removing thereby any alkali film adhering to the food contact surface and containing objectionable bacteria and nutrient therefor.

7. The process in accordance with claim 1 in which the solution contains levulinic acid.

8. The process in accordance with claim 1 in which the solution contains hydroxyacetic acid.

9. The process in accordance with claim 1 in which the solution contains water, an enzyme capable of peptizing protein, acid to render the solution on the acid side, a fat emulsifying agent, and a wetting agent to effect penetration.

10. The process in accordance with claim 1 in which the solution contains water, acid to render the solution on the acid side, a wetting agent to effect penetration and an enzyme capable of peptizing protein.

11. The process in accordance with claim 1 in which the solution contains water, acid to render the solution on the acid side, a wetting agent to effect penetration and a water soluble oil.

12. The process in accordance with claim 1 in which the solution contains a mixture of organic acids.

13. The process in accordance with claim 1 in which the solution contains a mixture of organic and inorganic acids.

14. The process in accordance with claim 1 in which the solution contains water, a mixture of organic acids to render the solution on the acid side, a wetting agent to effect penetration and a water soluble oil.

15. The process in accordance with claim 1 in which the solution contains water, a mixture of organic and inorganic acids to render the solution on the acid side, a wetting agent to effect penetration and a water soluble oil.

16. The process of cleaning containers which have been treated with an acid solution and rinsed comprising treating the same in accordance with claim 1.

17. The process of cleaning containers which comprises treating the same with an acid cleaning composition for chemically reacting with and releasing calcareous films including calcium and magnesium and calcareous films including protein and fat, which films are adhered to metal surfaces such as dairy equipment by the cementitious action of the calcareous constituents, said cleaner comprising an organic acid selected from the group consisting of levulinic, gluconic, and hydroxyacetic acids and mixtures of the same, which acids are substantially non-toxic, and a wetting agent compatible with the acid and chemically non-reactive therewith, the cleaning composition in aqueous solution penetrating said films and reacting with their calcareous constituents to solubilize the same whereby to release and loosen the adherent films, said acid cleaning composition being substantially non-reactive with the metal surfaces of the dairy equipment, and the said organic acid constituting the sole effective acid cleaning agent in the composition.

18. The process of cleaning containers which comprises treating the same with an acid cleaning composition for chemically reacting with and releasing calcareous films including calcium and magnesium and calcareous films including protein and fat, which films are adhered to metal surfaces such as dairy equipment by the cementitious action of the calcareous constituents, said cleaner comprising an organic acid selected from the group consisting of levulinic, gluconic, and hydroxyacetic acids and mixtures of the same, which acids are substantially non-toxic, and a wetting agent compatible with the acid and chemically non-reactive therewith, the cleaning composition in aqueous solution penetrating said films and reacting with their calcareous constituents to solubilize the same whereby to release and loosen the adherent films, said acid cleaning composition being substantially non-reactive with the metal surfaces of the dairy equipment, and the said organic acid constituting the sole effective acid cleaning agent in the composition, said composition containing a water-soluble oil as a corrosion inhibiting agent.

19. The process of cleaning containers which comprises treating the same with an acid cleaning composition for chemically reacting with and releasing calcareous films including calcium and magnesium and calcareous films including protein and fat, which films are adhered to metal surfaces such as dairy equipment by the cementitious action of the calcareous constituents, said cleaner comprising levulinic acid, which acid is substantially non-toxic, and a wetting agent compatible with the acid and chemically non-reactive therewith, the cleaning composition in aqueous solution penetrating said films and reacting with their calcareous constituents to solubilize the same whereby to release and loosen the adherent films, said acid cleaning composition being substantially non-reactive with the metal surfaces of the dairy equipment, and the said organic acid constituting the sole effective acid cleaning agent in the composition.

20. The process of cleaning containers which comprises treating the same with an acid cleaning composition for chemically reacting with and releasing calcareous films including calcium and magnesium and calcareous films including protein and fat, which films are adhered to metal surfaces such as dairy equipment by the cementitious action of the calcareous constituents, said cleaner comprising gluconic acid, which acid is substantially non-toxic, and a wetting agent compatible with the acid and chemically non-reactive therewith, the cleaning composition in aqueous solution penetrating said films and reacting with their calcareous constituents to solubilize the same whereby to release and loosen the adherent films, said acid cleaning composition being substantially non-reactive with the metal surfaces of the dairy equipment, and the said organic acid constituting the sole effective acid cleaning agent in the composition.

21. The process of cleaning containers which comprises treating the same with an acid cleaning composition for chemically reacting with and releasing calcareous films including calcium and magnesium and calcareous films including protein and fat, which films are adhered to metal surfaces such as dairy equipment by the cementitious action of the calcareous constituents, said cleaner comprising hydroxyacetic acid, which acid is substantially non-toxic, and a wetting agent compatible with the acid and chemically non-reactive therewith, the cleaning composition in aqueous solution penetrating said films and reacting with their calcareous constituents to solubilize the same whereby to release and loosen the adherent films, said acid cleaning composition being substantially non-reactive with the metal surfaces of the dairy equipment, and the said organic acid constituting the sole effective acid cleaning agent in the composition.

MILTON E. PARKER.
PAUL W. BONEWITZ.